United States Patent [19]
Morris

[11] 4,450,941
[45] May 29, 1984

[54] CONTROL SYSTEM FOR CONVERTER LOCK-UP AND SIMULTANEOUS PRESSURE REDUCTION

[75] Inventor: Hugh C. Morris, Morton, Ill.
[73] Assignee: Caterpillar Tractor Co., Peoria, Ill.
[21] Appl. No.: 523,318
[22] Filed: Aug. 15, 1983
[51] Int. Cl.³ .............................................. F16H 45/02
[52] U.S. Cl. ................................ 192/3.31; 192/3.58; 192/103 R
[58] Field of Search ................... 192/3.28, 3.29, 3.3, 192/3.31, 3.33, 3.57, 3.58, 103 R, 3.62, 109 F; 74/731, 732, 733, 753

[56] References Cited

U.S. PATENT DOCUMENTS

| | | | |
|---|---|---|---|
| 2,978,928 | 4/1961 | Tuck et al. | 74/645 |
| 3,321,056 | 5/1967 | Winchell et al. | 192/85 |
| 3,386,540 | 6/1968 | Horsch et al. | 192/0.09 |
| 3,390,594 | 7/1968 | Gillespie | 192/3.31 |
| 3,505,907 | 4/1970 | Fox et al. | 74/753 |
| 3,693,478 | 9/1972 | Malloy | 74/731 |
| 3,857,302 | 12/1974 | Morris | 74/733 |
| 3,985,046 | 10/1976 | Morris et al. | 192/3.31 |
| 4,095,486 | 6/1978 | Ohnuma | 192/3.29 |
| 4,270,636 | 6/1981 | Sunohara et al. | 192/3.31 |
| 4,281,676 | 8/1981 | Morris | 137/102 |
| 4,294,140 | 10/1981 | Iwanaga et al. | 192/3.31 |

Primary Examiner—George H. Krizmanich
Attorney, Agent, or Firm—J. W. Burrows

[57] ABSTRACT

A transmission control system is provided for use with a transmission assembly having a torque converter which couples a power input member with a transmission speed ratio section. A lock-up clutch is provided to selectively bypass the torque converter and couple the input member directly with the transmission speed ratio section. Some systems provide converter lock-up and lower transmission control pressure resposive to positioning of the transmission speed selector valve while others require additional complicated controls to operate the lock-up clutch of the converter and reduce transmission control pressure relative to the vacuum level of the prime mover. In the subject arrangement, a single valve (112) that is responsive to the output speed of the transmission (10) simultaneously actuates the lock-up clutch (32) of the torque converter (14) and lowers the operating pressure level of a dual stage pressure relief valve (72) by directing a fluid pressure signal to an actuating chamber (106) of the dual stage pressure relief valve (72). This arrangement ensures that the output speed of the transmission is operated at a sufficient low torque level before the lock-up clutch is actuated and furthermore does not require numerous complicated controls to lower the transmission control operating pressure and actuate the lock-up clutch.

21 Claims, 2 Drawing Figures

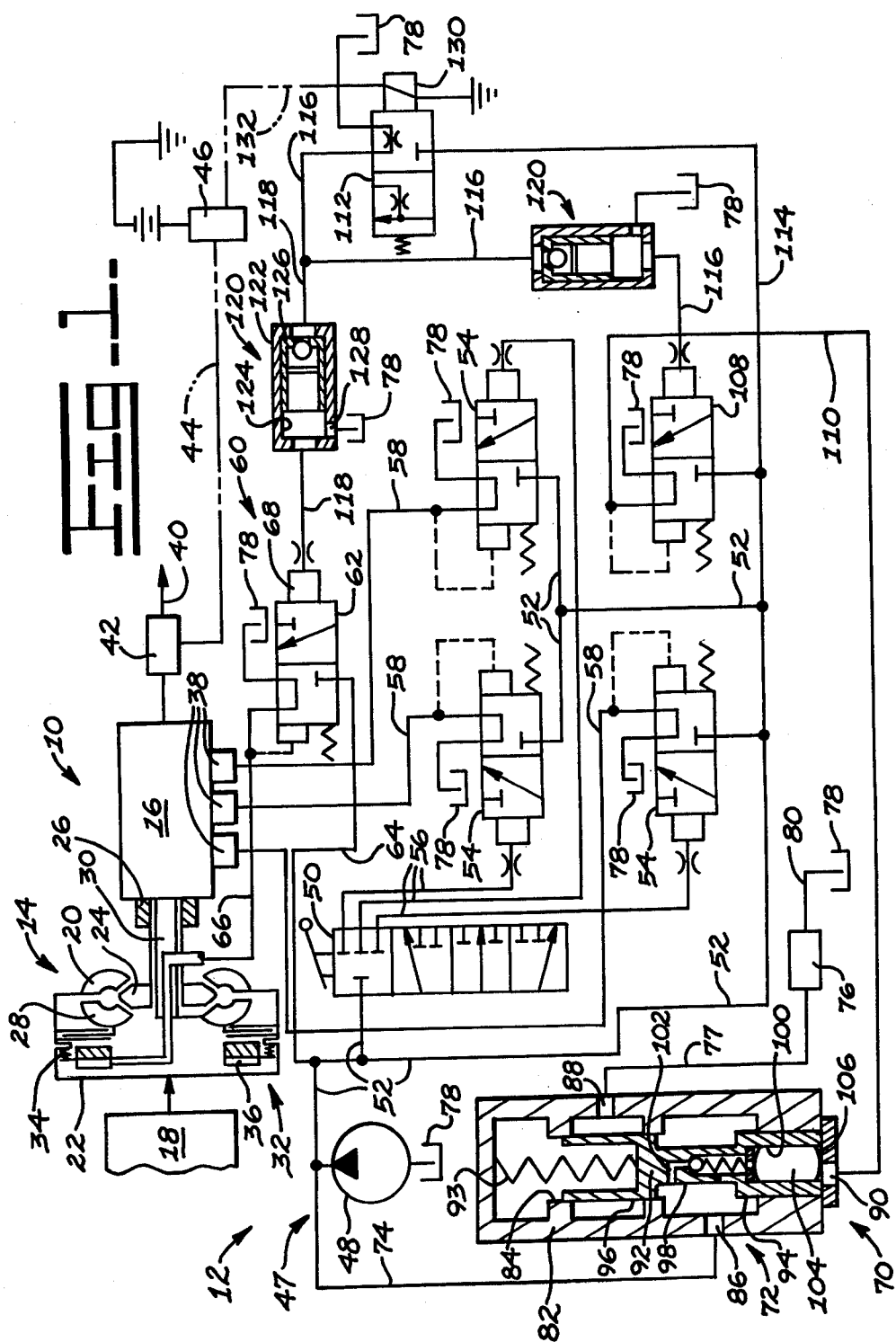

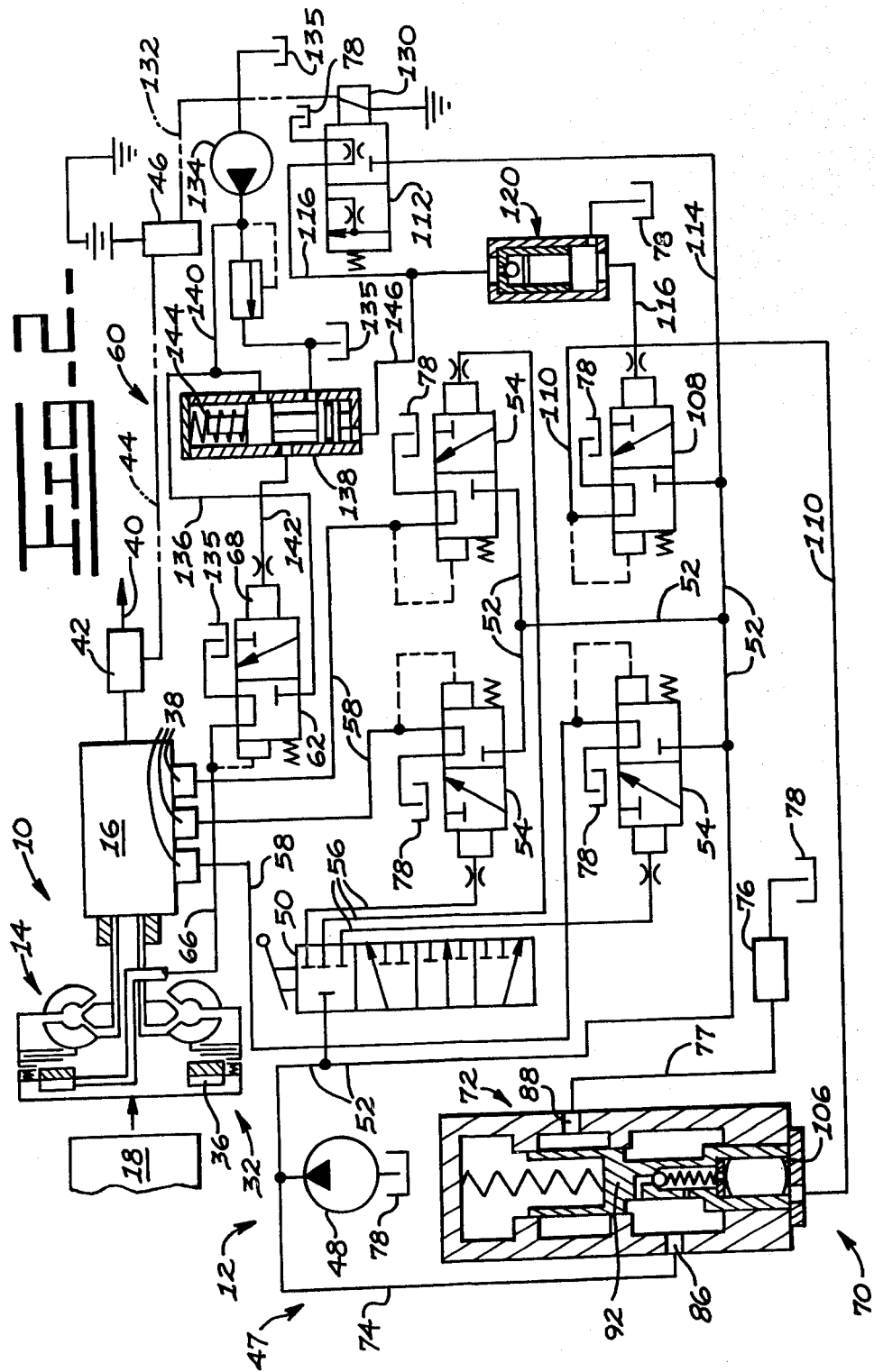

CONTROL SYSTEM FOR CONVERTER LOCK-UP AND SIMULTANEOUS PRESSURE REDUCTION

DESCRIPTION

Technical Field

This invention relates to a transmission control system and more particularly to a control system for simultaneously locking up a clutch in a torque converter and reducing the transmission control pressure level.

Background Art

Lock-up clutches are used in vehicle transmission systems to provide a converter bypass when the vehicle is being operated at high speeds and low torque requirements. When the lock-up clutch in the converter is actuated, a direct drive connection is made between the engine and the transmission. This direct drive connection is beneficial since there is no energy loss due to slippage in the converter. Furthermore, it is beneficial to lower the pressure level of the transmission control pressure when the vehicle is operated in direct drive since the torque requirements in direct drive are lower than the requirements in converter drive. The lower transmission control pressure also reduces leakage of control fluid being directed to the actuating chambers of the engaged transmission and converter clutches and minimizes energy consumption of the control pump during low torque operation. This is especially helpful if the converter clutches are of the rotating type.

Several of the known systems provide a converter lock-up and various forms of control pressure reduction during lock-up. However, these systems normally actuate the lock-up clutch and reduce the control pressure in response to the position of the transmission speed selector or in response to engagement or disengagement of certain transmission clutches.

Other systems provide lock-up of the torque converter after a desired engine speed has been attained and reduces the control pressure proportional to the reduction of the engine vacuum level. These arrangements require additional valving and controls which therefore adds significantly to the overall cost of the vehicle.

The present invention is directed to overcoming one or more of the problems as set forth above.

Disclosure of the Invention

In one aspect of the present invention a transmission control system is provided for use with a transmission assembly having a torque converter which couples the power input member with a transmission speed ratio section. A hydraulically actuated lock-up clutch is arranged to selectively bypass the torque converter and effectively couple the input member directly with the transmission speed ratio section. A source of pressurized control fluid is supplied to the torque converter and the transmission speed ratio section. A first valve means is provided for selectively directing pressurized fluid from the source to actuate the lock-up clutch. A second valve means is provided for controlling the pressure level between the source and the transmission speed ratio section to two distinct pressure levels. A single valve simultaneously actuates the first and second valve means to respectively actuate the lock-up clutch and reduce the pressure level of the source to the lower of the two distinct pressures. The single valve is actuated in response to the output speed of the transmission exceeding a predetermined speed.

The present invention provides a system which simultaneously actuates the lock-up clutch and reduces the transmission control pressure by actuation of a single valve. Since the operator can easily detect when the vehicle is in the direct drive mode of operation, he can be confident that the control system is operating at the lower pressure level and whenever the lock-up clutch is released for torque converter operation, the operator will know that the control pressure has been increased to the higher level. When operating in the torque converter drive, it is essential that the pressure of the control system be at the higher level to assure adequate pressure on the actuating members of the drive ratio clutches so that slippage is prevented. Furthermore, the simultaneous actuation of the lock-up clutch and the lowering of the control pressure by the single valve eliminates the need for extra valving and complicated controls.

BRIEF DESCRIPTION OF THE DRAWINGS

FIG. 1 is a partial schematic and diagrammatic illustration of a control system of an embodiment of the present invention; and FIG. 2 is a partial schematic and diagrammatic illustration of another embodiment of the present invention.

BEST MODE FOR CARRYING OUT THE INVENTION

Referring now to FIG. 1 of the drawings, a control system for controlling a transmission assembly 10 is generally indicated by the reference numeral 12. The transmission assembly 10 includes a torque converter 14 and a transmission speed ratio section 16.

The torque converter 14 is driven by an engine 18 and includes an impeller 20 which is directly coupled through a power input 22 with the engine 18. The power input 22 may, for example, be a rotating housing for the torque converter 14. A reactor element 24 is connected to a stationary housing 26 of the transmission speed ratio section 16. A turbine element 28 in the torque converter 14 is directly coupled with an input shaft 30 of the transmission section 16. A lock-up clutch 32 is conventionally associated with the torque converter and includes a plurality of springs 34 tending to maintain the clutch in a disengaged condition. The lock-up clutch 32 includes an actuating chamber 36 adapted to receive fluid pressure for actuation thereof.

The transmission assembly 10 is of a generally conventional power shift type including a plurality of clutches which are schematically illustrated by reference numeral 38. The clutches 38 are selectively engaged by the control system 12.

An output shaft 40 extends from the transmission assembly 10 for providing power to the wheels of a vehicle (not shown). A speed sensor 42 is located near the transmission assembly relative to the output shaft 40 for sensing the speed of the output shaft 40. An electrical line 44 transmits a signal representative of the speed of the output shaft 40 to a signal converter 46.

The transmission control system 12 includes a source 47 of pressurized control fluid, such as a pump 48, an operator controlled selector valve 50 connected to the pump 48 by a conduit 52, and a plurality of pilot operated clutch control valves 54 which are individually responsive to a signal from the selector valve 50 through respective conduits 56 to connect the pump 48 to the respective clutches 38. The conduit 52 further connects the pump 48 to the plurality of pressure responsive valves 54 while conduits 58 respectively connect the valves 54 to the respective clutches 38.

A first valve means 60 is provided for selectively directing pressurized fluid from the pump 48 to actuate the lock-up clutch 32. The first valve means 60 includes a two position valve 62 which is connected to the pump 48 by a conduit 64 and the conduit 52 and to the actuating chamber 36 of the lock-up clutch 32 by a conduit 66. The two position valve 62 includes a pilot actuation chamber 68.

A second valve means 70 is provided for controlling the pressure level between the pump 48 and the transmission speed ratio section 16 to two distinct pressure levels. The second valve means 70 includes a dual stage pressure relief valve 72 connected to the pump 48 by a conduit 74 and the conduit 52 and to a transmission lube system 76 by a conduit 77. The transmission lube system is connected to a tank 78 by a conduit 80. The dual stage pressure relief valve 72 includes a housing 82. The housing 82 has a bore 84 defined therein and an inlet port 86 connected to the conduit 74, an outlet port 88 connected to the conduit 77, and a signal port 90 each connected to the bore 84. A spool 92 is slidably disposed in the bore 84 and has a pair of lands 94,96 separated by an annular groove 98. The land 94 defines an axial bore 100 located therein. One end of the axial bore 100 opens to one end of the spool 92 while a transverse passage 102 defined in the spool 92 connects the other end of the bore 100 with the annular groove 98.

A reaction slug 104 is slidably disposed in the bore 100 of the spool 92 and an actuation chamber 106 is defined between the one end of the spool 92 and one end of the bore 84. A spring 93 is located in the bore 84 at the other end of the spool 92 and in abutment with the spool 92.

The second valve means 70 further includes a pressure responsive selector valve 108 connected to the pump 48 through the conduit 52 and to the signal port 90 of the dual stage pressure relief valve 72 by a conduit 110.

A single valve 112 is provided to simultaneously actuate the first and second valve means 60,72 to respectively actuate the lock-up clutch and reduce the pressure level of the pump 48 to the lower of the two distinct pressures in response to the output speed of the transmission 10 exceeding a predetermined speed. The single valve 112 is connected to the pump 48 through a conduit 114 which is connected to the conduit 52. The single valve 112 is connected to the pressure responsive selector valve 108 through a conduit 116 and to the pilot actuation chamber 68 of the two position valve 62 through a conduit 118 and the conduit 116. A quick release valve 120 is respectively located in each of the conduits 116 and 118 to allow the two position valve 62 and the pressure responsive selector valve 108 to respond more rapidly to release of pressurized fluid from the actuation chambers of the respective valves.

The quick release valves 120 include a housing 122 having a bore 124 defined therein and a check valve member 126 slidably disposed in the bore 124. The housing 122 further includes an exhaust port 128 connected to the bore 124 and to the tank 78.

The single valve 112 has a solenoid 130 connected thereto for actuation thereof. The solenoid 130 is connected to the signal converter 46 by an electrical line 132 and is further connected to a ground in a conventional manner.

An alternate embodiment of a transmission control system 12 of the present invention is disclosed in FIG. 2. It is noted that the same reference numerals of the first embodiment are used to designate similarly constructed counterpart elements of this embodiment. In this embodiment, however, the source 47 of pressurized fluid further includes a second pump 134 which receives fluid from a second tank 135 to supply the pressurized fluid for actuation of the lock-up clutch 32 of the torque converter 14. The conduit 64 of FIG. 1 which connects the pump 48 to the two position valve 62 is eliminated in FIG. 2 and replaced by a conduit 136 which connects the second pump 134 to the two position valve 62. The first valve means 60 as previously discussed relative to FIG. 1 further includes in FIG. 2 a relay valve 138 connected between the second pump 134 and the pilot actuation chamber 68 of the two position valve 62 respectively by conduits 140 and 142.

The relay valve 138 is spring biased to a first position by a spring 144 and movable to a second position in response to a pressure signal received from the single valve 112. The conduit 118 of FIG. 1 which was connected to conduit 116 is eliminated in FIG. 2 and replaced by a conduit 146 which is connected between the conduit 116 and the actuation chamber of the relay valve 138.

The two position valve 62, the plurality of pilot operated clutch control valves 54, and the pressure responsive selector valve 108 as shown in FIGS. 1 and 2 are preferably of the pressure modulating type valves. It is recognized that these valves could readily be of various constructions but one such valve that could be utilized in each of these instances is clearly shown and described in detail in U.S. Pat. No. 4,281,676 issued to Hugh C. Morris on Aug. 4, 1981 and of common assignee of this subject invention.

Industrial Applicability

In the use of the system, the engine 18 provides power through the torque converter 14 to the transmission speed ratio section 16 where the clutches 38 provide a variable output speed through the output member 40. The torque converter 14 provides a variable torque therethrough to allow the vehicle to be operated without stalling during low speed operation. By providing a pressurized fluid from the source 47 to the actuating chamber 36, the lock-up clutch 32 is engaged thus providing a direct drive between the engine 18 and the transmission speed ratio section 16. The direct drive connection provides a more efficient operation between the engine 18 and the output shaft 40 but does not allow any slippage during high torque conditions such that the engine 18 could stall when operated in this condition. Consequently, the speed sensor 42 senses the rotational speed of the output shaft 40 and unlocks the torque converter 14 once the output speed of the output shaft 40 decreases below a predetermined minimum value.

In the use of the transmission control system 12, and particularly the control system as shown in FIG. 1, the pump 48 provides pressurized fluid to the selector valve 50 and simultaneously to the plurality of pilot operated clutch control valves 54. By selective movement of the selector valve 50, one of the pilot operated clutch control valves 54 is actuated to direct pressurized fluid from the pump 48 to the respective control valve 54 which operates the respective clutch 38 to provide one of the output speed ranges for the output shaft 40. Selective actuation of either of the other valves 54 would likewise provide actuation of the respective clutch 38 to provide a different output speed range to the output shaft 40 in a conventional manner. It should be recognized that depending on the number of output speeds desired other pilot operated clutch control valves 54 and clutches 38 could be added to the system without departing from the essence of the invention.

The dual stage pressure relief valve 72 controls the pressure level in the control system to a first predetermined pressure level whenever the system is operating in the torque converter mode of operation. The operating pressure of the pump 48 as conducted to the inlet port 86 is communicated to one end of the reaction slug 104 through the transverse passage 102 and acts against an area of the spool 92 equal to the area of the end of the reaction slug 104. The resulting force moves the spool 92 against the bias of the spring 93 from the first position at which the inlet port 86 is blocked from the outlet port 88 towards the second position at which the inlet port 86 modulatably communicates with the outlet port 88. This establishes an operating control pressure in the system sufficiently high to ensure that the respective clutches 38 are not allowed to slip during the high torque conditions of the lower speeds when the torque converter is operating in the torque converter mode of operation.

The single solenoid operated valve 112 is movable between a first position, as shown, at which the pump 48 is blocked from actuating the lock-up clutch 32 and a second position at which the pump 48 is communicated therethrough to the conduits 116,118 to actuate the two position valve 62. The two position valve 62 is movable between a first position at which the pump 48 is blocked from the actuating chamber 36 of the lock-up clutch 32 and a second position at which the pump 48 is in fluid communication with the actuating chamber 36 to actuate the lock-up clutch 32.

In the second position of the solenoid operated valve 112 the pressurized fluid conducted therethrough to conduit 116 communicates with the actuating chamber of the pressure responsive selector valve 108. The selector valve 108 is spring biased to the first position, as shown, at which the pump 48 is blocked from communication with the actuating chamber 106 of the dual stage pressure relief valve 72 and to a second position at which the pump 48 is in fluid communication with the actuating chamber 106. The pressure responsive selector valve 108 is movable to the second position in response to pressurized fluid from the pump 48 being directed to the actuating chamber of the selector valve 108 through the conduit 116.

The dual stage pressure relief valve is responsive to the fluid pressure signal in the actuating chamber 106 to reduce the operating pressure level of the pump 48. The fluid pressure signal in the actuating chamber 106 acts on an effective area of the one end of the spool 92 minus the area of the reaction slug 104 to create an additional force opposing the bias of the spring 93. This additional force is additive to the force created by the pressurized fluid from the pump 48 acting through the transverse passage 102 on the effective area of the spool 92 that is equal to the area of the end of the reaction slug 104. Consequently the spool 92 moves towards its second position against the bias of the spring 93 at the lower operating pressure level of the pump 48.

The solenoid operated valve 112 is movable to the second position in response to an electrical signal from the signal converter 46 energizing the solenoid valve 130. The electrical signal is produced in response to the speed of the output shaft 40 exceeding the predetermined speed of the output shaft 40 as sensed by the speed sensor 42.

The quick response valves 120 allow fluid flow to pass from the solenoid operated valve 112 to the respective two position valve 62 and the pressure responsive selector valve 108 and at the same time the check member 126 blocks the exhaust port 128. Upon moving the solenoid control valve 112 to its first position, the check member 126 in the respective quick response valve 120 uncovers the exhaust port 128 and quickly exhausts the actuating chambers of the two position valve 62 and the pressure responsive selector valve 108 so that the valves move back to their respective first positions more quickly.

The operation of the alternate embodiment as shown in FIG. 2 is quite similar with the exception that the lock-up clutch 32 is operated by a separate circuit that uses fluid from the second pump 134. The fluid from the second pump 134 is totally separate from the fluid of the first pump 48.

In the embodiment shown in FIG. 2, the solenoid actuated valve 112 provides pressurized fluid to the pressure responsive selector valve 108 through conduit 116 as previously described in FIG. 1. However, in this embodiment the conduit 146 further directs the pressurized fluid from the solenoid actuated valve 112 to operate the relay valve 138 against the bias of the spring 144. With the relay valve 138 moved to the second position, fluid flow from the pump 134 is directed to the actuating chamber 68 of the two position valve 62 shifting the two position valve 62 to its second position. In the second position of the two position valve 62 pressurized fluid from the second pump 134 is directed therethrough to the actuating chamber 36 of the lock-up clutch 32 for conditioning the torque converter 14 to operate in the direct drive mode of operation.

In view of the foregoing, it is readily apparent that the control system shown in both embodiments provides a control system that is responsive to a single valve to simultaneously actuate a lock-up clutch of a torque converter and to lower the operating control pressure in the control system in response to the output speed of the transmission exceeding a predetermined speed. Furthermore, the control system does not require numerous complicated controls to provide the lock-up mode of operation and the simultaneous lowering of the control pressure.

Other aspects, objects and advantages of this invention can be obtained from a study of the drawings, the disclosure and the appended claims.

I claim:

1. A transmission control system (12) adapted for use with a transmission assembly (10) having a torque converter (14) for coupling a power input member (22) with a transmission speed ratio section (16), a hydraulically actuated lock-up clutch (32) arranged to selectively bypass the torque converter (14) and effectively couple the input member (22) directly with the transmission speed ratio section (16), and a source (47) of pressurized control fluid for supplying fluid to the torque converter (14) and the transmission speed ratio section (16), the system comprising:

first valve means (60) for selectively directing pressurized fluid from the source (47) to actuate the lock-up clutch (32);

second valve means (70) for controlling the pressure level between the source (47) and the transmission speed ratio section (16) to two distinct pressure levels; and single valve means (112) adapted to simultaneously actuate the first and second valve means (60,70) to respectively actuate the lock-up clutch (32) and reduce the pressure level of the source (47) to the lower of the two distinct pressures in response to the output speed of the transmission (10) exceeding a predetermined speed.

2. The control system (12), as set forth in claim 1, wherein the first valve means (60) includes a two position valve (62) connected between the lock-up clutch (32) and the source (47) and movable between a first position at which communication between the source (47) and the lock-up clutch (32) is blocked and a second position at which the source (47) is in fluid communication with the lock-up clutch (32), said two position valve (62) being moved to the second position in response to actuation of said single valve (112).

3. The control system (12), as set forth in claim 2, wherein the two position valve (62) has a pilot actuation chamber (68) and a conduit (118) connecting the actuation chamber (68) to the single valve (112).

4. The control system (12), as set forth in claim 3, wherein the second valve means (70) includes a dual stage pressure relief valve (72) connected to said source (47) of pressurized control fluid and adapted to establish the two distinct pressure levels.

5. The control system (12), as set forth in claim 4, wherein said dual stage pressure relief valve (72) is conditioned to establish the lower of the two distinct pressure levels in response to actuation of the single valve (112).

6. The control system (12), as set forth in claim 5, wherein the two stage pressure relief valve (72) includes an actuation chamber (106) and the second valve means (70) further includes a pressure responsive selector valve (108) connected between the source (47) and said actuation chamber (106), said selector valve (108) being movable between a first position at which fluid communication from the source (47) is blocked from the actuation chamber (106) and a second position at which the fluid communication is open, said selector valve (108) being movable to the second position in response to actuation of the single valve (112).

7. The control system (12), as set forth in claim 6, wherein the two stage pressure relief valve (72) includes a housing (82) defining a bore (84) therein, an inlet port (86), an outlet port (88) and a signal port (90) located in the housing (82) and intersecting the bore (84); and a spool (92) slideably located in the bore (84) and adapted to controllably interconnect the inlet port (86) and the outlet port (88) in response to the pressure level in the inlet port (86) exceeding the higher of the two distinct pressure levels and the source (47) being blocked from the actuation chamber (106).

8. The control system (12), as set forth in claim 7, wherein said spool (92) defines an annular groove (98) located between a pair of lands (94,96), an axial bore (100) in one of said lands (94,96), one end of which opens to one end of the spool, and a transverse passage (102) connecting the other end of the axial bore (100) to the annular groove (98); and including a reaction slug (104) slideably disposed in said axial bore (100), said actuation chamber (106) being defined between one end of the bore (84) and the one end of the spool (92).

9. The control system (12), as set forth in claim 8, wherein the two stage pressure relief valve (72) includes a spring (93), the spool (92) is movable between a first position at which communication between the inlet port (86) and the outlet port (88) is blocked and a second position at which the communication is open, said spool being movable to the second position in response to the pressure level in the inlet port (86) exceeding said higher pressure level and said source (47) being blocked from the actuation chamber (106), and biased to the first position by the spring (93).

10. The control system (12), as set forth in claim 9, wherein said lower pressure level is established in response to a pressurized fluid signal fluid being communicated to said actuation chamber (106).

11. The control system (12), as set forth in claim 10, wherein the single valve means (112) is a solenoid actuated valve movable between a non-actuated position at which the fluid from said source (47) is blocked from said two position valve (62) and said selector valve (108) and an actuated position at which the fluid from said source (47) is free to communicate with said two position valve (62) and said selector valve (108).

12. The control system (12), as set forth in claim 1, wherein the source (47) of pressurized control fluid includes first and second pumps (48,134).

13. The control system (12), as set forth in claim 12, wherein the first valve means (60) includes a two position valve (62) connected between the lock-up clutch (32) and the second pump (134) and movable between a first position at which communication between the second pump (134) and the lock-up clutch (32) is blocked and a second position at which the second pump (134) communicates with the lock-up clutch (32), said two position valve (62) being spring biased to the first position and movable to the second position in response to actuation of said single valve (112).

14. The control system (12), as set forth in claim 13, wherein the two position valve (62) includes a pilot actuation chamber (68), and said first valve means (60) further includes a relay valve (138) connected between the pilot actuation chamber (68) and the second pump (134), said relay valve (138) being spring biased to a position blocking communication between the second pump (134) and the pilot actuation chamber (68) and movable to a second position at which said communication between the second pump (134) and the pilot actuation chamber (68) is open, said relay valve (138) being movable to the second position in response to actuation of the single valve (112).

15. The control system (12), as set forth in claim 14, wherein said second valve means (70) includes a dual stage pressure relief valve (72) connected to said first pump (48) and adapted to establish the two distinct pressure levels.

16. The control system (12), as set forth in claim 15, wherein the two stage pressure relief valve (72) includes an actuation chamber (106), and the second valve means (70) further includes a pressure responsive selector valve (108) connected between the first pump (48) and the actuation chamber (106) of the relief valve (72), said selector valve (108) being spring biased to a first position at which communication between the first pump (48) and the actuation chamber (106) is blocked and a second position at which said communication is open, said selector valve (108) being movable to the second position in response to actuation of the single valve (112).

17. The control system (12), as, set forth in claim 16, wherein the single valve means (112) is a solenoid actuated valve movable between a non-actuated position at which fluid from the the first pump (48) is blocked from said relay valve (138) and said selector valve (108) and an actuated position at which fluid from the first pump (48) is free to communicate with said relay valve (138) and said selector valve (108).

18. The control system (12), as set forth in claim 15, wherein the two stage pressure relief valve (72) includes a housing (82) defining a bore (84) therein, an inlet port (86), an outlet port (88) and a signal port (90) located in the housing (82) and intersecting the bore (84); a spool (92) slideably located in the bore (84) and defining an annular groove (98) located between a pair of lands (94,96), an axial bore (100) in one of the pair of lands (94,96), one end of which opens to one end of the spool (92), and a transverse passage (102) connecting the other end of the axial bore (100) to the annular groove (98); a reaction slug (104) slideably disposed in said axial bore (100); and an actuation chamber (106) defined between one end of the bore (84) and the one end of the spool (92), said signal port (90) opening into the actuation chamber (106).

19. The control system (12), as set forth in claim 18, wherein said first pump (48) is connected to the inlet port (86) of the two stage pressure relief valve (72) and said two stage relief valve 72 includes a spring (93) located in the other end of the bore (84), the spool (92) is movable between a first position at which the inlet port (86) is blocked from the outlet port (88) by the other of the pair of lands (94,96), and a second position at which the inlet port (86) is in open communication with the outlet port (88), said spool (92) being movable to the second position in response to the fluid pressure at the inlet port (86) acting through the transverse passage (102) against the reaction slug (104) exceeding the higher of the two distinct pressure levels and the first pump (48) being blocked from the actuation chamber (106), the spool (92) being biased to the first position by the spring (93).

20. The control system (12) as set forth in claim 19, wherein the lower of the two distinct pressure levels is established in response to a fluid pressure signal being communicated to the actuating chamber (106) of the two stage pressure relief valve (72).

21. A transmission assembly and control system, comprising:
a power input member (22);
a transmission speed ratio section (16);
a torque converter (14) coupled with the power input member (22) and the transmission speed ratio section (16), said torque converter (14) including a hydraulically actuated lock-up clutch (32) adapted to selectively bypass the torque converter (14) and effectively couple the input member (22) directly with the transmission speed ratio section (16);
a source (47) of pressurized control fluid adapted to supply pressurized fluid to the lock-up clutch (32) and the transmission speed ratio section (16);
first valve means (60) for selectively directing pressurized fluid from said source (47) to actuate said lock-up clutch (32);
second valve means (70) for controlling the pressure level between the source (47) and the transmission speed ratio section (16) to two distinct pressure levels; and
single valve means (112) adapted to simultaneously actuate the first and second valve means (60,70) to respectively actuate the lock-up clutch (32) and reduce the pressure level of the source (47) to the lower of the two distinct pressures in response to the output speed of the transmission (10) exceeding a predetermined speed.

* * * * *